United States Patent
Alperovitch et al.

(10) Patent No.: US 8,045,458 B2
(45) Date of Patent: Oct. 25, 2011

(54) PRIORITIZING NETWORK TRAFFIC

(75) Inventors: Dmitri Alperovitch, Atlanta, GA (US);
Paula Greve, Lino Lakes, MN (US);
Paul Judge, Atlanta, GA (US); Sven Krasser, Atlanta, GA (US); Phyllis Adele Schneck, Atlanta, GA (US)

(73) Assignee: McAfee, Inc., Santa Clara, CA (US)

( * ) Notice: Subject to any disclaimer, the term of this patent is extended or adjusted under 35 U.S.C. 154(b) by 217 days.

(21) Appl. No.: 11/937,274

(22) Filed: Nov. 8, 2007

(65) Prior Publication Data
US 2009/0122699 A1  May 14, 2009

(51) Int. Cl.
*G01R 31/08* (2006.01)

(52) U.S. Cl. ....................................................... 370/230

(58) Field of Classification Search .................. 370/203, 370/229–240, 241–253, 298–309, 345, 351–388, 370/395.1, 395.3, 395.4, 395.5, 395.52, 395.53, 370/395.54, 400–411, 412–421, 428–430, 370/458, 468, 508
See application file for complete search history.

(56) References Cited

U.S. PATENT DOCUMENTS

| | | | |
|---|---|---|---|
| 4,289,930 A | 9/1981 | Connolly et al. | |
| 4,384,325 A | 5/1983 | Slechta et al. | |
| 4,386,416 A | 5/1983 | Giltner et al. | |
| 4,532,588 A | 7/1985 | Foster | |
| 4,713,780 A | 12/1987 | Schultz et al. | |
| 4,754,428 A | 6/1988 | Schultz et al. | |
| 4,837,798 A | 6/1989 | Cohen et al. | |
| 4,853,961 A | 8/1989 | Pastor | |
| 4,864,573 A | 9/1989 | Horsten | |
| 4,951,196 A | 8/1990 | Jackson | |
| 4,975,950 A | 12/1990 | Lentz | |
| 4,979,210 A | 12/1990 | Nagata et al. | |
| 5,008,814 A | 4/1991 | Mathur | |
| 5,020,059 A | 5/1991 | Gorin et al. | |
| 5,051,886 A | 9/1991 | Kawaguchi et al. | |
| 5,054,096 A | 10/1991 | Beizer | |
| 5,105,184 A | 4/1992 | Pirani et al. | |
| 5,119,465 A | 6/1992 | Jack et al. | |
| 5,144,557 A | 9/1992 | Wang | |

(Continued)

FOREIGN PATENT DOCUMENTS

CA  2564533  12/2005

(Continued)

OTHER PUBLICATIONS

Article entitled "An Example-Based Mapping Method for Text Categorization and Retrieval" by Yang et. al., in *ACM Transactions on Information Systems*, Jul. 1994, vol. 12, No. 3, pp. 252-277.

(Continued)

*Primary Examiner* — Kwang B Yao
*Assistant Examiner* — Jung-Jen Liu
(74) *Attorney, Agent, or Firm* — Fish & Richardson P.C.

(57) ABSTRACT

Methods and systems for operation upon one or more data processors for prioritizing transmission among a plurality of data streams based upon a classification associated with the data packets associated with each of the plurality of data streams, respectively. Systems and methods can operate to allocate bandwidth to priority data streams first and recursively allocate remaining bandwidth to lesser priority data streams based upon the priority associated with those respective lesser priority data streams.

19 Claims, 7 Drawing Sheets

U.S. PATENT DOCUMENTS

| | | | |
|---|---|---|---|
| 5,144,659 A | 9/1992 | Jones | |
| 5,144,660 A | 9/1992 | Rose | |
| 5,167,011 A | 11/1992 | Priest | |
| 5,210,824 A | 5/1993 | Putz et al. | |
| 5,210,825 A | 5/1993 | Kavaler | |
| 5,235,642 A | 8/1993 | Wobber et al. | |
| 5,239,466 A | 8/1993 | Morgan et al. | |
| 5,247,661 A | 9/1993 | Hager et al. | |
| 5,276,869 A | 1/1994 | Forrest et al. | |
| 5,278,901 A | 1/1994 | Shieh et al. | |
| 5,283,887 A | 2/1994 | Zachery | |
| 5,293,250 A | 3/1994 | Okumura et al. | |
| 5,313,521 A | 5/1994 | Torii et al. | |
| 5,319,776 A | 6/1994 | Hile et al. | |
| 5,355,472 A | 10/1994 | Lewis | |
| 5,367,621 A | 11/1994 | Cohen et al. | |
| 5,377,354 A | 12/1994 | Scannell et al. | |
| 5,379,340 A | 1/1995 | Overend et al. | |
| 5,379,374 A | 1/1995 | Ishizaki et al. | |
| 5,404,231 A | 4/1995 | Bloomfield | |
| 5,406,557 A | 4/1995 | Baudoin | |
| 5,414,833 A | 5/1995 | Hershey et al. | |
| 5,416,842 A | 5/1995 | Aziz | |
| 5,418,908 A | 5/1995 | Keller et al. | |
| 5,424,724 A | 6/1995 | Williams et al. | |
| 5,479,411 A | 12/1995 | Klein | |
| 5,481,312 A | 1/1996 | Cash et al. | |
| 5,483,466 A | 1/1996 | Kawahara et al. | |
| 5,485,409 A | 1/1996 | Gupta et al. | |
| 5,495,610 A | 2/1996 | Shing et al. | |
| 5,509,074 A | 4/1996 | Choudhury et al. | |
| 5,511,122 A | 4/1996 | Atkinson | |
| 5,513,126 A | 4/1996 | Harkins et al. | |
| 5,513,323 A | 4/1996 | Williams et al. | |
| 5,530,852 A | 6/1996 | Meske, Jr. et al. | |
| 5,535,276 A | 7/1996 | Ganesan | |
| 5,541,993 A | 7/1996 | Fan et al. | |
| 5,544,320 A | 8/1996 | Konrad | |
| 5,550,984 A | 8/1996 | Gelb | |
| 5,550,994 A | 8/1996 | Tashiro et al. | |
| 5,557,742 A | 9/1996 | Smaha et al. | |
| 5,572,643 A | 11/1996 | Judson | |
| 5,577,209 A | 11/1996 | Boyle et al. | |
| 5,602,918 A | 2/1997 | Chen et al. | |
| 5,606,668 A | 2/1997 | Shwed | |
| 5,608,819 A | 3/1997 | Ikeuchi | |
| 5,608,874 A | 3/1997 | Ogawa et al. | |
| 5,619,648 A | 4/1997 | Canale et al. | |
| 5,632,011 A | 5/1997 | Landfield et al. | |
| 5,638,487 A | 6/1997 | Chigier | |
| 5,644,404 A | 7/1997 | Hashimoto et al. | |
| 5,657,461 A | 8/1997 | Harkins et al. | |
| 5,673,322 A | 9/1997 | Pepe et al. | |
| 5,675,507 A | 10/1997 | Bobo, II | |
| 5,675,733 A | 10/1997 | Williams | |
| 5,677,955 A | 10/1997 | Doggett et al. | |
| 5,694,616 A | 12/1997 | Johnson et al. | |
| 5,696,822 A | 12/1997 | Nachenberg | |
| 5,706,442 A | 1/1998 | Anderson et al. | |
| 5,708,780 A | 1/1998 | Levergood et al. | |
| 5,708,826 A | 1/1998 | Ikeda et al. | |
| 5,710,883 A | 1/1998 | Hong et al. | |
| 5,727,156 A | 3/1998 | Herr-Hoyman et al. | |
| 5,740,231 A | 4/1998 | Cohn et al. | |
| 5,742,759 A | 4/1998 | Nessett et al. | |
| 5,742,769 A | 4/1998 | Lee et al. | |
| 5,745,574 A | 4/1998 | Muftic | |
| 5,751,956 A | 5/1998 | Kirsch | |
| 5,758,343 A | 5/1998 | Vigil et al. | |
| 5,764,906 A | 6/1998 | Edelstein et al. | |
| 5,768,528 A | 6/1998 | Stumm | |
| 5,771,348 A | 6/1998 | Kubatzki et al. | |
| 5,778,372 A | 7/1998 | Cordell et al. | |
| 5,781,857 A | 7/1998 | Hwang et al. | |
| 5,781,901 A | 7/1998 | Kuzma | |
| 5,790,789 A | 8/1998 | Suarez | |
| 5,790,790 A | 8/1998 | Smith et al. | |
| 5,790,793 A | 8/1998 | Higley | |
| 5,793,763 A | 8/1998 | Mayes et al. | |
| 5,793,972 A | 8/1998 | Shane | |
| 5,796,942 A | 8/1998 | Esbensen | |
| 5,796,948 A | 8/1998 | Cohen | |
| 5,801,700 A | 9/1998 | Ferguson | |
| 5,805,719 A | 9/1998 | Pare, Jr. et al. | |
| 5,812,398 A | 9/1998 | Nielsen | |
| 5,812,776 A | 9/1998 | Gifford | |
| 5,822,526 A | 10/1998 | Waskiewicz | |
| 5,822,527 A | 10/1998 | Post | |
| 5,826,013 A | 10/1998 | Nachenberg | |
| 5,826,014 A | 10/1998 | Coley et al. | |
| 5,826,022 A | 10/1998 | Nielsen | |
| 5,826,029 A | 10/1998 | Gore, Jr. et al. | |
| 5,835,087 A | 11/1998 | Herz et al. | |
| 5,845,084 A | 12/1998 | Cordell et al. | |
| 5,850,442 A | 12/1998 | Muftic | |
| 5,855,020 A | 12/1998 | Kirsch | |
| 5,860,068 A | 1/1999 | Cook | |
| 5,862,325 A | 1/1999 | Reed et al. | |
| 5,864,852 A | 1/1999 | Luotonen | |
| 5,878,230 A | 3/1999 | Weber et al. | |
| 5,884,033 A | 3/1999 | Duvall et al. | |
| 5,892,825 A | 4/1999 | Mages et al. | |
| 5,893,114 A | 4/1999 | Hashimoto et al. | |
| 5,896,499 A | 4/1999 | McKelvey | |
| 5,898,836 A | 4/1999 | Freivald et al. | |
| 5,903,723 A | 5/1999 | Beck et al. | |
| 5,911,776 A | 6/1999 | Guck | |
| 5,923,846 A | 7/1999 | Gage et al. | |
| 5,930,479 A | 7/1999 | Hall | |
| 5,933,478 A | 8/1999 | Ozaki et al. | |
| 5,933,498 A | 8/1999 | Schneck et al. | |
| 5,937,164 A | 8/1999 | Mages et al. | |
| 5,940,591 A | 8/1999 | Boyle et al. | |
| 5,948,062 A | 9/1999 | Tzelnic et al. | |
| 5,958,005 A | 9/1999 | Thorne et al. | |
| 5,963,915 A | 10/1999 | Kirsch | |
| 5,978,799 A | 11/1999 | Hirsch | |
| 5,987,609 A | 11/1999 | Hasebe | |
| 5,991,881 A | 11/1999 | Conklin et al. | |
| 5,999,932 A | 12/1999 | Paul | |
| 6,003,027 A | 12/1999 | Prager | |
| 6,006,329 A | 12/1999 | Chi | |
| 6,012,144 A | 1/2000 | Pickett | |
| 6,014,651 A | 1/2000 | Crawford | |
| 6,023,723 A | 2/2000 | McCormick et al. | |
| 6,029,256 A | 2/2000 | Kouznetsov | |
| 6,035,423 A | 3/2000 | Hodges et al. | |
| 6,052,709 A | 4/2000 | Paul | |
| 6,058,381 A | 5/2000 | Nelson | |
| 6,058,482 A | 5/2000 | Liu | |
| 6,061,448 A | 5/2000 | Smith et al. | |
| 6,061,722 A | 5/2000 | Lipa et al. | |
| 6,072,942 A | 6/2000 | Stockwell et al. | |
| 6,092,114 A | 7/2000 | Shaffer et al. | |
| 6,092,194 A | 7/2000 | Touboul | |
| 6,094,277 A | 7/2000 | Toyoda | |
| 6,094,731 A | 7/2000 | Waldin et al. | |
| 6,104,500 A | 8/2000 | Alam et al. | |
| 6,108,688 A | 8/2000 | Nielsen | |
| 6,108,691 A | 8/2000 | Lee et al. | |
| 6,108,786 A | 8/2000 | Knowlson | |
| 6,118,856 A | 9/2000 | Paarsmarkt et al. | |
| 6,119,137 A | 9/2000 | Smith et al. | |
| 6,119,142 A | 9/2000 | Kosaka | |
| 6,119,230 A | 9/2000 | Carter | |
| 6,119,236 A | 9/2000 | Shipley | |
| 6,122,661 A | 9/2000 | Stedman et al. | |
| 6,141,695 A | 10/2000 | Sekiguchi et al. | |
| 6,141,778 A | 10/2000 | Kane et al. | |
| 6,145,083 A | 11/2000 | Shaffer et al. | |
| 6,151,675 A | 11/2000 | Smith | |
| 6,161,130 A | 12/2000 | Horvitz et al. | |
| 6,185,689 B1 | 2/2001 | Todd, Sr. et al. | |
| 6,192,407 B1 | 2/2001 | Smith et al. | |
| 6,199,102 B1 | 3/2001 | Cobb | |
| 6,202,157 B1 | 3/2001 | Brownlie et al. | |
| 6,219,714 B1 | 4/2001 | Inhwan et al. | |

| | | | | | | |
|---|---|---|---|---|---|---|
| 6,223,213 B1 | 4/2001 | Cleron et al. | | 6,907,430 B2 | 6/2005 | Chong et al. |
| 6,249,575 B1 | 6/2001 | Heilmann et al. | | 6,910,135 B1 | 6/2005 | Grainger |
| 6,249,807 B1 | 6/2001 | Shaw et al. | | 6,928,556 B2 | 8/2005 | Black et al. |
| 6,260,043 B1 | 7/2001 | Puri et al. | | 6,941,348 B2 | 9/2005 | Petry et al. |
| 6,269,447 B1 | 7/2001 | Maloney et al. | | 6,941,467 B2 | 9/2005 | Judge et al. |
| 6,269,456 B1 | 7/2001 | Hodges et al. | | 6,968,461 B1 | 11/2005 | Lucas et al. |
| 6,272,532 B1 | 8/2001 | Feinleib | | 7,143,213 B2 * | 11/2006 | Need et al. ...................... 710/67 |
| 6,275,942 B1 | 8/2001 | Bernhard et al. | | 7,164,678 B2 * | 1/2007 | Connor ........................ 370/392 |
| 6,279,113 B1 | 8/2001 | Vaidya | | 7,272,149 B2 | 9/2007 | Bly et al. |
| 6,279,133 B1 | 8/2001 | Vafai et al. | | 7,349,332 B1 * | 3/2008 | Srinivasan et al. ............. 370/229 |
| 6,282,565 B1 | 8/2001 | Shaw et al. | | 7,376,731 B2 * | 5/2008 | Khan et al. ..................... 709/224 |
| 6,285,991 B1 | 9/2001 | Powar | | 7,385,924 B1 * | 6/2008 | Riddle ........................ 370/235 |
| 6,289,214 B1 | 9/2001 | Backstrom | | 7,460,476 B1 * | 12/2008 | Morris et al. ............... 370/230.1 |
| 6,298,445 B1 | 10/2001 | Shostack et al. | | 7,522,516 B1 * | 4/2009 | Parker .......................... 370/216 |
| 6,301,668 B1 | 10/2001 | Gleichauf et al. | | 7,545,748 B1 * | 6/2009 | Riddle ......................... 370/235 |
| 6,304,898 B1 | 10/2001 | Shiigi | | 2001/0049793 A1 | 12/2001 | Sugimoto |
| 6,304,973 B1 | 10/2001 | Williams | | 2002/0004902 A1 | 1/2002 | Toh et al. |
| 6,311,207 B1 | 10/2001 | Mighdoll et al. | | 2002/0016910 A1 | 2/2002 | Wright et al. |
| 6,317,829 B1 | 11/2001 | Van Oorschot | | 2002/0023089 A1 * | 2/2002 | Woo ............................ 707/101 |
| 6,320,948 B1 | 11/2001 | Heilmann et al. | | 2002/0023140 A1 | 2/2002 | Hile et al. |
| 6,321,267 B1 | 11/2001 | Donaldson | | 2002/0026591 A1 | 2/2002 | Hartley et al. |
| 6,324,569 B1 | 11/2001 | Ogilvie et al. | | 2002/0032871 A1 | 3/2002 | Malan et al. |
| 6,324,647 B1 | 11/2001 | Bowman-Amuah | | 2002/0035683 A1 | 3/2002 | Kaashoek et al. |
| 6,324,656 B1 | 11/2001 | Gleichauf et al. | | 2002/0042876 A1 | 4/2002 | Smith |
| 6,330,589 B1 | 12/2001 | Kennedy | | 2002/0046041 A1 | 4/2002 | Lang |
| 6,347,374 B1 | 2/2002 | Drake et al. | | 2002/0049853 A1 | 4/2002 | Chu et al. |
| 6,353,886 B1 | 3/2002 | Howard et al. | | 2002/0078382 A1 | 6/2002 | Sheikh et al. |
| 6,363,489 B1 | 3/2002 | Comay et al. | | 2002/0087882 A1 | 7/2002 | Schneier et al. |
| 6,370,648 B1 | 4/2002 | Diep | | 2002/0095492 A1 | 7/2002 | Kaashoek et al. |
| 6,373,950 B1 | 4/2002 | Rowney | | 2002/0112185 A1 | 8/2002 | Hodges |
| 6,385,655 B1 | 5/2002 | Smith et al. | | 2002/0116627 A1 | 8/2002 | Tarbotton et al. |
| 6,393,465 B2 | 5/2002 | Leeds | | 2002/0120853 A1 | 8/2002 | Tyree |
| 6,393,568 B1 | 5/2002 | Ranger et al. | | 2002/0133365 A1 | 9/2002 | Grey et al. |
| 6,405,318 B1 | 6/2002 | Rowland | | 2002/0138416 A1 | 9/2002 | Lovejoy et al. |
| 6,434,624 B1 * | 8/2002 | Gai et al. ...................... 709/232 | | 2002/0138755 A1 | 9/2002 | Ko |
| 6,442,588 B1 | 8/2002 | Clark et al. | | 2002/0138759 A1 | 9/2002 | Dutta |
| 6,442,686 B1 | 8/2002 | McArdle et al. | | 2002/0138762 A1 | 9/2002 | Horne |
| 6,453,345 B2 | 9/2002 | Trcka et al. | | 2002/0143963 A1 | 10/2002 | Converse et al. |
| 6,460,141 B1 | 10/2002 | Olden | | 2002/0147734 A1 | 10/2002 | Shoup et al. |
| 6,470,086 B1 | 10/2002 | Smith | | 2002/0152399 A1 | 10/2002 | Smith |
| 6,487,599 B1 | 11/2002 | Smith et al. | | 2002/0165971 A1 | 11/2002 | Baron |
| 6,487,666 B1 | 11/2002 | Shanklin et al. | | 2002/0172367 A1 | 11/2002 | Mulder et al. |
| 6,502,191 B1 | 12/2002 | Smith et al. | | 2002/0178227 A1 | 11/2002 | Matsa et al. |
| 6,516,411 B2 | 2/2003 | Smith | | 2002/0178383 A1 | 11/2002 | Hrabik et al. |
| 6,519,703 B1 | 2/2003 | Joyce | | 2002/0188864 A1 | 12/2002 | Jackson |
| 6,539,430 B1 | 3/2003 | Humes | | 2002/0194469 A1 | 12/2002 | Dominique et al. |
| 6,546,416 B1 | 4/2003 | Kirsch | | 2002/0199095 A1 | 12/2002 | Bandini et al. |
| 6,546,493 B1 | 4/2003 | Magdych et al. | | 2003/0005326 A1 | 1/2003 | Flemming |
| 6,550,012 B1 | 4/2003 | Villa et al. | | 2003/0009554 A1 | 1/2003 | Burch et al. |
| 6,574,737 B1 | 6/2003 | Kingsford et al. | | 2003/0009693 A1 | 1/2003 | Brock et al. |
| 6,578,025 B1 | 6/2003 | Pollack et al. | | 2003/0009696 A1 | 1/2003 | Bunker, V et al. |
| 6,609,196 B1 | 8/2003 | Dickinson, III et al. | | 2003/0009699 A1 | 1/2003 | Gupta et al. |
| 6,650,890 B1 | 11/2003 | Iriam et al. | | 2003/0014664 A1 | 1/2003 | Hentunen |
| 6,654,787 B1 | 11/2003 | Aronson et al. | | 2003/0023692 A1 | 1/2003 | Moroo |
| 6,675,153 B1 | 1/2004 | Cook et al. | | 2003/0023695 A1 | 1/2003 | Kobata et al. |
| 6,681,331 B1 | 1/2004 | Munson et al. | | 2003/0023873 A1 | 1/2003 | Ben-Itzhak |
| 6,687,687 B1 | 2/2004 | Smadja | | 2003/0023874 A1 | 1/2003 | Prokupets et al. |
| 6,697,950 B1 | 2/2004 | Ko | | 2003/0023875 A1 | 1/2003 | Hursey et al. |
| 6,701,440 B1 | 3/2004 | Kim et al. | | 2003/0028803 A1 | 2/2003 | Bunker, V et al. |
| 6,704,874 B1 | 3/2004 | Porras et al. | | 2003/0033516 A1 | 2/2003 | Howard et al. |
| 6,711,127 B1 | 3/2004 | Gorman et al. | | 2003/0033542 A1 | 2/2003 | Goseva-Popstojanova et al. |
| 6,725,377 B1 | 4/2004 | Kouznetsov | | 2003/0041264 A1 | 2/2003 | Black et al. |
| 6,732,101 B1 | 5/2004 | Cook | | 2003/0051026 A1 | 3/2003 | Carter et al. |
| 6,732,157 B1 | 5/2004 | Gordon et al. | | 2003/0051163 A1 | 3/2003 | Bidaud |
| 6,735,703 B1 | 5/2004 | Kilpatrick et al. | | 2003/0051168 A1 | 3/2003 | King et al. |
| 6,738,462 B1 | 5/2004 | Brunson | | 2003/0055931 A1 | 3/2003 | Cravo De Almeida et al. |
| 6,742,124 B1 | 5/2004 | Kilpatrick et al. | | 2003/0061506 A1 | 3/2003 | Cooper et al. |
| 6,742,128 B1 | 5/2004 | Joiner | | 2003/0065943 A1 | 4/2003 | Geis et al. |
| 6,754,705 B2 | 6/2004 | Joiner et al. | | 2003/0084280 A1 | 5/2003 | Bryan et al. |
| 6,757,830 B1 | 6/2004 | Tarbotton et al. | | 2003/0084320 A1 | 5/2003 | Tarquini et al. |
| 6,760,309 B1 * | 7/2004 | Rochberger et al. .......... 370/235 | | 2003/0084323 A1 | 5/2003 | Gales |
| 6,768,991 B2 | 7/2004 | Hearnden | | 2003/0084347 A1 | 5/2003 | Luzzatto |
| 6,769,016 B2 | 7/2004 | Rothwell et al. | | 2003/0088792 A1 | 5/2003 | Card et al. |
| 6,775,657 B1 | 8/2004 | Baker | | 2003/0093667 A1 | 5/2003 | Dutta et al. |
| 6,792,546 B1 | 9/2004 | Shanklin et al. | | 2003/0093695 A1 | 5/2003 | Dutta |
| 6,892,178 B1 | 5/2005 | Zacharia | | 2003/0093696 A1 | 5/2003 | Sugimoto |
| 6,892,179 B1 | 5/2005 | Zacharia | | 2003/0095555 A1 | 5/2003 | McNamara et al. |
| 6,892,237 B1 | 5/2005 | Gai et al. | | 2003/0097439 A1 | 5/2003 | Strayer et al. |
| 6,895,385 B1 | 5/2005 | Zacharia et al. | | 2003/0097564 A1 | 5/2003 | Tewari et al. |

| | | | |
|---|---|---|---|
| 2003/0105976 A1 | 6/2003 | Copeland, III | |
| 2003/0110392 A1 | 6/2003 | Aucsmith et al. | |
| 2003/0110396 A1 | 6/2003 | Lewis et al. | |
| 2003/0115485 A1 | 6/2003 | Milliken | |
| 2003/0115486 A1 | 6/2003 | Choi et al. | |
| 2003/0123665 A1 | 7/2003 | Dunstan et al. | |
| 2003/0126464 A1 | 7/2003 | McDaniel et al. | |
| 2003/0126472 A1 | 7/2003 | Banzhof | |
| 2003/0135749 A1 | 7/2003 | Gales et al. | |
| 2003/0140137 A1 | 7/2003 | Joiner et al. | |
| 2003/0140250 A1 | 7/2003 | Taninaka et al. | |
| 2003/0145212 A1 | 7/2003 | Crumly | |
| 2003/0145225 A1 | 7/2003 | Bruton, III et al. | |
| 2003/0145226 A1 | 7/2003 | Bruton, III et al. | |
| 2003/0149887 A1 | 8/2003 | Yadav | |
| 2003/0149888 A1 | 8/2003 | Yadav | |
| 2003/0152096 A1 | 8/2003 | Chapman | |
| 2003/0154393 A1 | 8/2003 | Young | |
| 2003/0154399 A1 | 8/2003 | Zuk et al. | |
| 2003/0154402 A1 | 8/2003 | Pandit et al. | |
| 2003/0158905 A1 | 8/2003 | Petry et al. | |
| 2003/0159069 A1 | 8/2003 | Choi et al. | |
| 2003/0159070 A1 | 8/2003 | Mayer et al. | |
| 2003/0167402 A1 | 9/2003 | Stolfo et al. | |
| 2003/0172166 A1 | 9/2003 | Judge et al. | |
| 2003/0172167 A1 | 9/2003 | Judge et al. | |
| 2003/0172289 A1 | 9/2003 | Soppera | |
| 2003/0172291 A1 | 9/2003 | Judge et al. | |
| 2003/0172292 A1 | 9/2003 | Judge | |
| 2003/0172294 A1 | 9/2003 | Judge | |
| 2003/0172301 A1 | 9/2003 | Judge et al. | |
| 2003/0172302 A1 | 9/2003 | Judge et al. | |
| 2003/0187996 A1 | 10/2003 | Cardina et al. | |
| 2003/0212791 A1 | 11/2003 | Pickup | |
| 2003/0233328 A1 | 12/2003 | Scott et al. | |
| 2004/0015554 A1 | 1/2004 | Wilson | |
| 2004/0025044 A1 | 2/2004 | Day | |
| 2004/0054886 A1 | 3/2004 | Dickinson et al. | |
| 2004/0058673 A1 | 3/2004 | Iriam et al. | |
| 2004/0059811 A1 | 3/2004 | Sugauchi et al. | |
| 2004/0088570 A1 | 5/2004 | Roberts et al. | |
| 2004/0111531 A1 | 6/2004 | Staniford et al. | |
| 2004/0139160 A1 | 7/2004 | Wallace et al. | |
| 2004/0139334 A1 | 7/2004 | Wiseman | |
| 2004/0177120 A1 | 9/2004 | Kirsch | |
| 2004/0203589 A1 | 10/2004 | Wang et al. | |
| 2004/0205135 A1 | 10/2004 | Hallam-Baker | |
| 2004/0267893 A1 | 12/2004 | Lin | |
| 2005/0021738 A1 | 1/2005 | Goeller | |
| 2005/0052998 A1 | 3/2005 | Oliver et al. | |
| 2005/0065810 A1 | 3/2005 | Bouron | |
| 2005/0102366 A1 | 5/2005 | Kirsch | |
| 2005/0141427 A1* | 6/2005 | Bartky | 370/235 |
| 2005/0262209 A1 | 11/2005 | Yu | |
| 2005/0262210 A1 | 11/2005 | Yu | |
| 2006/0015942 A1* | 1/2006 | Judge et al. | 726/24 |
| 2006/0036727 A1 | 2/2006 | Kurapati et al. | |
| 2006/0042483 A1 | 3/2006 | Work et al. | |
| 2006/0095404 A1 | 5/2006 | Adelman et al. | |
| 2006/0123083 A1 | 6/2006 | Goutte et al. | |
| 2006/0191002 A1 | 8/2006 | Lee et al. | |
| 2006/0212925 A1 | 9/2006 | Shull et al. | |
| 2006/0212930 A1 | 9/2006 | Shull et al. | |
| 2006/0212931 A1 | 9/2006 | Shull et al. | |
| 2006/0230039 A1 | 10/2006 | Shull et al. | |
| 2006/0253458 A1* | 11/2006 | Dixon et al. | 707/10 |
| 2007/0199070 A1 | 8/2007 | Hughes | |
| 2007/0214151 A1* | 9/2007 | Thomas et al. | 707/10 |
| 2008/0175266 A1* | 7/2008 | Alperovitch et al. | 370/465 |
| 2008/0178259 A1* | 7/2008 | Alperovitch et al. | 726/2 |
| 2009/0003204 A1* | 1/2009 | Okholm et al. | 370/230 |
| 2009/0113016 A1* | 4/2009 | Sen et al. | 709/207 |
| 2009/0254499 A1* | 10/2009 | Deyo | 706/12 |
| 2009/0254572 A1* | 10/2009 | Redlich et al. | 707/10 |

FOREIGN PATENT DOCUMENTS

| | | |
|---|---|---|
| EP | 0375138 A2 | 6/1990 |
| EP | 0413537 A2 | 2/1991 |
| EP | 0420779 A2 | 4/1991 |
| EP | 0720333 A2 | 7/1996 |
| EP | 0838774 A2 | 4/1998 |
| EP | 0869652 A2 | 10/1998 |
| EP | 0907120 A2 | 4/1999 |
| EP | 1326376 | 7/2003 |
| EP | 1271846 | 7/2005 |
| GB | 2271002 | 3/1994 |
| JP | 18350870 | 12/2006 |
| KR | 10-0447082 B1 | 3/2004 |
| KR | 2006-0012137 | 2/2006 |
| KR | 1020060041934 | 5/2006 |
| KR | 10-0699531 B1 | 3/2007 |
| KR | 10-0737523 B1 | 7/2007 |
| KR | 10-0750377 B1 | 8/2007 |
| KR | 10-2006-0028200 A | 9/2007 |
| WO | WO 96/35994 | 11/1996 |
| WO | WO 99/05814 | 2/1999 |
| WO | WO 99/33188 | 7/1999 |
| WO | WO 99/37066 | 7/1999 |
| WO | WO 00/42748 | 7/2000 |
| WO | WO 01/17165 | 3/2001 |
| WO | WO 01/50691 | 7/2001 |
| WO | WO 01/76181 | 10/2001 |
| WO | WO 02/13469 | 2/2002 |
| WO | WO 02/13489 | 2/2002 |
| WO | WO 02/075547 | 9/2002 |
| WO | WO 02/091706 | 11/2002 |
| WO | WO 2004/061703 | 7/2004 |
| WO | WO 2004/081734 | 9/2004 |
| WO | WO 2005/116851 | 12/2005 |
| WO | WO 2008/008543 | 1/2008 |

OTHER PUBLICATIONS

Article entitled "A Comparison of Two Learning Algorithms for Text Categorization" by Lewis et al., in *Third Annual Symposium on Document Analysis and Information Retrieval*, Apr. 11-13, 1994, pp. 81-92.

Article entitled "Learning Limited Dependence Bayesian Classifiers" by Sahami, in *Proceedings of the Second International Conference on Knowledge Discovery and Data Mining*, 1996, pp. 335-338.

Article entitled "An Evaluation of Phrasal and Clustered Representations on a Text Categorization Task" by Lewis, in *15th Ann Int'l SIGIR*, Jun. 1992, pp. 37-50.

Book entitled *Machine Learning* by Mitchell, 1997, pp. 180-184.

Article entitled "Learning Rules that Classify E-mail" by Cohen, pp. 1-8. Date unknown.

Article entitled "Hierarchically classifying documents using very few words" by Koller et. al., in *Proceedings of the Fourteenth International Conference on Machine Learning*, 1997.

Article entitled "Classification of Text Documents" by Li et. al., in *The Computer Journal*, vol. 41, No. 8, 1998, pp. 537-546.

Article entitled "Issues when designing filters in messaging systems" by Palme et. al., in 19 *Computer Communications*, 1996, pp. 95-101.

Article entitled "Text Categorization with Support Vector Machines: Learning with Many Relevant Features" by Joachins in *Machine Learning: ECML-98*, Apr. 1998, pp. 1-14.

Article entitled "Hierarchical Bayesian Clustering for Automatic Text Classification" by Iwayama et al. in *Natural Language*, pp. 1322-1327. Date unknown.

Article entitled "Smokey: Automatic Recognition of Hostile Messages" by Spertus in *Innovative Applications* 1997, pp. 1058-1065.

Article entitled "A Comparison of Classifiers and Document Representations for the Routing Problem" by Schutze. Date unknown.

Article entitled "CAFE: A Conceptual Model for Managing Information in Electronic Mail" by Takkinen et al. in *Proc. 31st Annual Hawaii International Conference on System Sciences*, 1998, pp. 44-53.

Article entitled "A Comparative Study on Feature Selection in Text Categorization" by Yang et. al. Date unknown.

Article entitled "Spam!" by Cranor et. al. in *Communications Of The ACM*, vol. 41, No. 8, Aug. 1998, pp. 74-83.

Article entitled "Sendmail And Spam" by LeFebvre in *Performance Computing*, Aug. 1998, pp. 55-58.

Article entitled "Implementing a Generalized Tool for Network Monitoring" by Ranum et. al. in *LISA XI*, Oct. 26-31, 1997, pp. 1-8.
Article entitled "Method For Automatic Contextual Transposition Upon Receipt Of Item Of Specified Criteria" printed Feb. 1994 in *IBM Technical Disclosure Bulletin*, vol. 37, No. 2B, p. 333.
Article entitled "Toward Optimal Feature Selection" by Koller et al., in *Machine Learning: Proc. of the Thirteenth International Conference*, 1996.
Website: Technical Focus—Products—Entegrity AssureAccess. www2.entegrity.com.
Website: Create Secure Internet Communication Channels—Atabok Homepage. www.atabok.com.
Website: ATABOK VCNMAIL™ Secure Email Solution—Atabok Related Produces. www.atabok.com.
Website: ATABOK VCN Auto-Exchange™—Atabok Related Produces. www.atabok.com.
Website: Controlling Digital Assets Is A Paramount Need For All Business—Atabok Related Produces. www.atabok.com.
Website: Control Your Confidential Communications with ATABOK—Atabok Related Produces. www.atabok.com.
Website: Entrust Entelligence—Entrust Homepage. www.entrust.com.
Website: E-mail Plug-in—Get Technical/Interoperability—Entrust Entelligence. www.entrust.com.
Website: E-mail Plug-in—Get Technical/System Requirements—Entrust Entelligence. www.entrust.com.
Website: E-mail Plug-in—Features and Benefits—Entrust Entelligence. www.entrust.com.
Website: Internet Filtering Software—Internet Manager Homepage. www.elronsw.com.
Website: ESKE—Email with Secure Key Exchange—ESKE. www.danu.ie.
Website: Terminet—ESKE. www.danu.ie.
Website: Baltimore Focus on e-Security—Baltimore Technologies. www.baltimore.com.
Article entitled "Securing Electronic Mail Systems" by Serenelli et al., in *Communications—Fusing Command Control and Intelligence: MILCOM '92*, 1992, pp. 677-680.
Article entitled "Integralis' Minesweeper defuses E-mail bombs" by Kramer et. al., in *PC Week*, Mar. 18, 1996, p. N17-N23.
Article entitled "A Toolkit and Methods for Internet Firewalls" by Ranum et. al., in *Proc. of USENIX Summer 1994 Technical Conference*, Jun. 6-10, 1994, pp. 37-44.
Article entitled "Firewall Systems: The Next Generation" by McGhie, in *Integration Issues in Large Commercial Media Delivery Systems: Proc. of SPIE—The International Society for Optical Engineering*, Oct. 23-24, 1995, pp. 270-281.
Article entitled "Design of the TTI Prototype Trusted Mail Agent" by Rose et. al., in *Computer Message Systems—85: Proc. of the IFIP TC 6 International Symposium on Computer Message Systems*, Sep. 5-7, 1985, pp. 377-399.
Article entitled "Designing an Academic Firewall: Policy, Practice, and Experience with SURF" by Greenwald et. al., in *Proc. of the 1996 Symposium on Network and Distributed Systems Security*, 1996, pp. 1-14.
Article entitled "X Through the Firewall, and Other Application Relays" by Treese et. al. in *Proc. of the USENIX Summer 1993 Technical Conference*, Jun. 21-25, 1993, pp. 87-99.
Article entitled "Firewalls For Sale" by Bryan, in *BYTE*, Apr. 1995, pp. 99-104.
Article entitled "A DNS Filter and Switch for Packet-filtering Gateways" by Cheswick et al., in *Proc. of the Sixth Annual USENIX Security Symposium: Focusing on Applications of Cryptography*, Jul. 22-25, 1996, pp. 15-19.
Article entitled "Safe Use of X Window System Protocol Across A Firewall" by Kahn, in *Proc. of the Fifth USENIX UNIX Security Symposium*, Jun. 5-7, 1995, pp. 105-116.
Article entitled "Automating the OSI to Internet Management Conversion Through the Use of an Object-Oriented Platform" by Pavlou et al., in *Proc. of the IFIP TC6/WG6.4 International Conference on Advanced Information Processing Techniques for LAN and MAN Management*, Apr. 7-9, 1993, pp. 245-260.
Article entitled "A Secure Email Gateway (Building an RCAS External Interface)" by Smith, in *Tenth Annual Computer Security Applications Conference*, Dec. 5-9, 1994, pp. 202-211.
Article entitled "Secure External References in Multimedia Email Messages" by Wiegel, in *3rd ACM Conference on Computer and Communications Security*, Mar. 14-16, 1996, pp. 11-18.
Memo entitled "SOCKS Protocol Version 5" by Leech et. al., in *Standards Track*, Mar. 1996, pp. 1-9.
Article entitled "Securing the Web: fire walls, proxy servers, and data driver attacks" by Farrow in *InfoWorld*, Jun. 19, 1995, vol. 17, No. 25, p. 103.
Website: Go Secure! for Microsoft Exchange—Products/Services—Verisign, Inc. www.verisign.com.
Article entitled "MIMEsweeper defuses virus network, net mail bombs" by Avery, in *Info World*, May 20, 1996, vol. 12, No. 21, p. N1.
Article entitled "Stomping out mail viruses" by Wilkerson, in *PC Week*, Jul. 15, 1996, p. N8.

* cited by examiner

PRIORITIZING NETWORK TRAFFIC

TECHNICAL FIELD

This document relates generally to systems and methods for processing communications and more particularly to systems and methods for prioritizing network traffic.

BACKGROUND

Internet connectivity has become central to many daily activities. For example, millions of people worldwide use the internet for various bill pay and banking functionalities. Countless more people use the internet for shopping, entertainment, to obtain news, and for myriad other purposes. Moreover, many businesses relies on the internet for communicating with suppliers and customers, as well as providing a resource library for their employees.

However, a large amount of traffic that is communicated by the internet is relatively unimportant or not time critical. For example, electronic mail is typically not time sensitive. Thus, whether electronic mail is delivered instantaneously or delayed by an hour often does not make a difference. Such unimportant communication traffic has the potential to delay and/or disrupt more important traffic.

SUMMARY

In one aspect, systems, methods, apparatuses and computer program products are provided. In one aspect, methods are disclosed, which comprise: receiving a plurality of network traffic streams, the network traffic streams comprising data communicated between sender devices and recipient devices; parsing the network traffic streams based upon one or more transmission protocol associated with the network traffic streams, the parsing being operable to identify characteristics of data packets respectively associated with the traffic streams; applying a plurality of tests to the data packets or groupings of data packets, each of the plurality of tests being operable to test some or all of the data packets for a classification characteristic; generating a results array based upon the classification characteristics identified by the plurality of tests; classifying each of the data packets into one or more classifications from a plurality of classifications based upon the results array; and, prioritizing the traffic streams associated with the data packets based upon a prioritization scheme, the prioritization scheme being based on the one or more classifications associated with the data packet.

Systems can include a classification module, a prioritization module and a communications interface. The classification module can receive data packets associated with one or more data streams and can classify each of the plurality of data streams into one or more classifications. The prioritization module can prioritize transmission of the data packets based upon a prioritization scheme, the prioritization scheme including a prioritization of each of the classifications, wherein the application of the prioritization scheme is operable to identify a priority data stream. The communications interface can allocate bandwidth to the priority data stream before allocation of any remaining bandwidth to remaining data streams.

DETAILED DESCRIPTION

Figure 1:
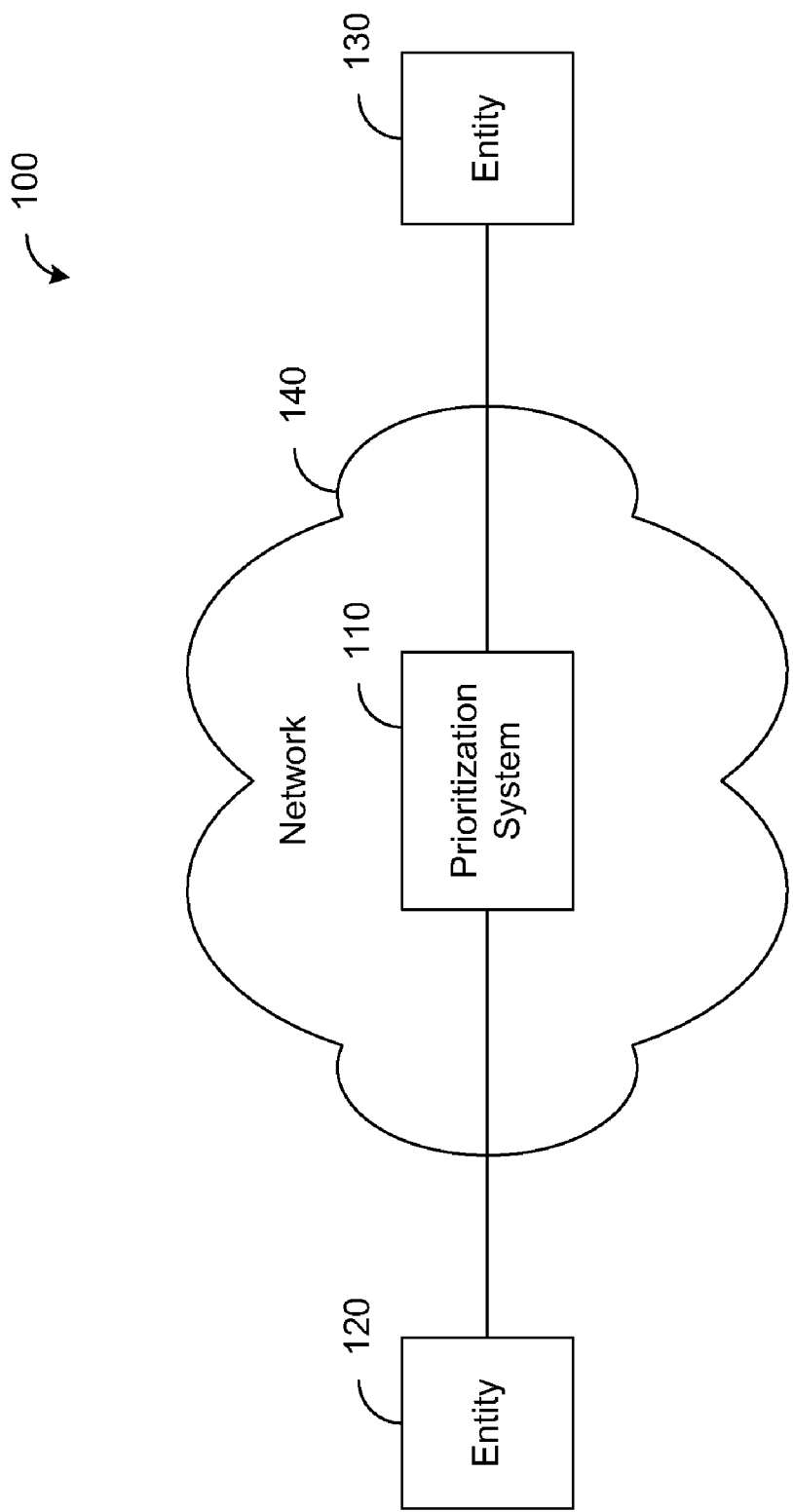
FIG. 1 is a block diagram depicting network including a network traffic prioritization system.

FIG. 1 is a block diagram depicting network environment 100 including a network traffic prioritization system 110. The network traffic prioritization system 110 can operate to prioritize communications between a first entity 120 and a second entity 130 over a network 140. In some implementations, the traffic can be prioritized based upon a classification associated with the traffic. The prioritization, in various implementations, can operate to allocate more bandwidth to higher priority communications while allocating less bandwidth to lower priority communications. For example, communications that are classified as the highest priority (e.g., national security, commercial, business oriented, etc.) can be allocated bandwidth first, while communications classified as the lowest priority (e.g., spam, music downloads, adult content, social traffic, gaming content, entertainment content, malicious content, etc.) can be allocated any remaining bandwidth after higher priority communications have been transmitted.

In other implementations, the network traffic prioritization system 110 can have the ability to block types of network traffic based upon one or both of a classification associated with the network traffic or a reputation of an entity associated with the network traffic. In further implementations, the network traffic prioritization system 110 can prioritize certain network traffic based upon classification(s) associated with the network traffic and/or reputations of one or more entities associated with the network traffic, while blocking other network traffic based upon classification(s) of the network traffic and/or reputations of one or more entities associated with the network traffic.

In some implementations, the network traffic prioritization system 110 can be controlled by an administrator (e.g., internet service provider (ISP) or government entity). In various implementations, priority can be based on policy and can be received from an administrator and/or dynamically changed for technical reasons (e.g., exhaustion of bandwidth), legislative rule making (e.g., government policy) or business decision (e.g., conservation of resources) or a combination thereof. For example, in an emergency situation legitimate communications should not be slowed by bulk network traffic (e.g., spam, adult content, music downloads, etc.). In other implementations, the network traffic prioritization system 110 can receive input from the first or second entity indicating that the traffic being communicated between the entities should be prioritized over other traffic. For example, the government emergency telephone service (GETS) provides an access code to high level government workers for use during times of crisis, when phone systems are often overloaded. Such systems could be expanded to data networks to provide robust data access during emergencies.

In some implementations, the first entity and/or the second entity can include a variety of different computing devices.

For example, computing devices can include personal computers, routers, servers, mobile communications devices (e.g., cellular phones, mobile electronic mail (e-mail) devices, 802.11x equipped laptop computers, laptop computers equipped evolution-data optimized (EV-DO) access cards, etc.), among many others. In other implementations, the first entity 120 and/or the second entity 130 can include networks. For example, networks can include sub-nets, wireless networks, cellular networks, data networks, voice networks, intranets, infranets, etc.

In various implementations, The first entity 120 and second entity 130 can communicate with each other through a network 140. The network 140, for example, can be the internet. In other examples, the network 140 can include intranets, sub-nets, etc. The first entity and second entity can communicate a variety of classifications of data. The network traffic prioritization system 110 can classify the data, and can apply a prioritization scheme to the data.

In some implementations, the prioritization scheme can allocate network bandwidth to highest priority data classifications first, and recursively allocate bandwidth to successively lower priority data classifications until there is no more bandwidth or all data classifications have been allocated bandwidth. For example, if there are classifications of business traffic having first priority, news traffic having second priority, and spam traffic having third priority, the business traffic can be allocated bandwidth first, the news traffic can be allocated bandwidth second (if any bandwidth is available), and the spam traffic can be allocated bandwidth third (if any bandwidth is available).

In other implementations, a prioritization scheme can specify that traffic can be allocated normally until a threshold network usage is reached. In such implementations, upon detecting the threshold network usage, the network traffic prioritization system 110 can disrupt a low priority data stream when a higher priority data stream is received, the priorities being based upon a prioritization scheme. For example, when a network 140 is experiencing heavy usage, the network traffic prioritization system 110 can disconnect a existing spam traffic stream from the system when a new business traffic stream instance is received or can block an outbound connection where the destination is a known phishing site, according to data from, for example, the classification or reputation modules.

In still further implementations, the network traffic prioritization system 110 can communicate high priority traffic first, and wait for periods of inactivity during which to send lower priority traffic based upon the prioritization scheme. For example, if high priority traffic can be placed in a high priority queue for transmission, while lower priority traffic can be placed in a low priority queue for transmission. In such examples, the data in the low priority queue might not be transmitted until the high priority queue is empty. Thus, the network traffic prioritization system can transmit all of the high priority traffic and then transmit lower priority traffic until more high priority traffic is received or all of the low priority traffic has been transmitted.

In other implementations, the network traffic prioritization scheme can include blocking certain classifications of network traffic and/or network traffic associated with network entities have a specified reputation. For example, network traffic associated with entities having a reputation for originating spam can be blocked from traversing the network. In further implementations, the prioritization scheme in addition to block certain types of network traffic can prioritize other network traffic having a specified classification or reputation can be prioritized over other traffic. In some examples, network traffic which is neither blocked nor prioritized can be transmitted as normal priority (e.g., using available bandwidth, transmitted during periods of low usage, using a reserved segment of bandwidth for normal priority traffic, etc.). In still further examples, the prioritization scheme can specify to block network traffic having a first classification while specifying to de-prioritize network traffic having another classification. De-prioritization of traffic can provide for transmitting low priority traffic (e.g., entertainment, streaming music or video, etc.) with low bandwidth, while blocking can provide for elimination of unwanted traffic (e.g., spam traffic, malware traffic, bot traffic, malicious traffic, etc.).

In various implementations, prioritization schemes according to any of the above implementations of prioritization schemes can be combined.

Figure 2:
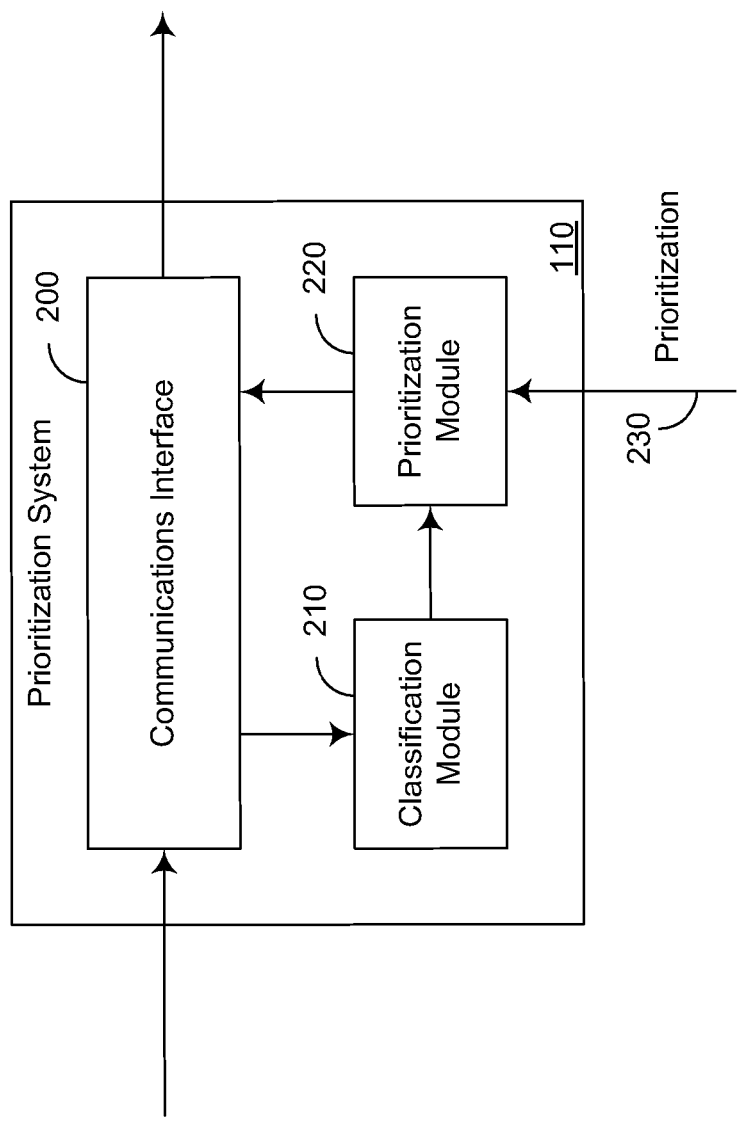
FIG. 2 is a block diagram depicting an example of a network traffic prioritization system.

FIG. 2 is a block diagram depicting an example of a network traffic prioritization system 110a. In some implementations, the network traffic prioritization system 110a can include a communications interface 200, a classification module 210 and a prioritization module 220. In some implementations, the communications interface 200 can be a router. For example, the communications interface 200 operable to receive data packets from an originating entity (e.g., entity 120 of FIG. 1) and to forward the data packets to a receiving entity (e.g., entity 130 of FIG. 1). In such examples, the communications interface 200 can parse a data packet to determine how to route the data packet.

In various implementations, the classification module 210 can operate to classify data streams based upon the characteristics associated with the data streams. The classification module 210 can apply multiple tests to an individual communication and derive a result array from the message. The result array can be compared to characteristics of known communication classifications in order to define the classification associated with the data stream. Classification of data is described in more detail by U.S. patent application Ser. No. 11/173,941, entitled "Message Profiling Systems and Methods," filed on Jun. 2, 2005, which is hereby incorporated by reference in its entirety. Classification of data is further described by U.S. patent application Ser. No. 11/173,941, entitled "Content-based Policy Compliance Systems and Methods, filed on May 15, 2006, which is hereby incorporated by reference in its entirety. The classification module 210, in some examples, can be provided by a TrustedSource™ database, available from Secure Computing Corporation of San Jose, Calif., which can operate to provide classification definitions against which communications can be compared for classification.

In various implementations, the classification module 210 can classify data into one or more of a number of categories. In various implementations, the categories can include, for example, adult content, spam content, music content, electronic mail traffic, electronic commerce traffic, business traffic, social traffic, web 2.0 traffic, messaging traffic, conferencing traffic, medical content, search traffic, gaming content, entertainment content, education content, syndicated content, podcast content, malicious content, opinion content, informational content, or news content. In some implementations, the categories can be identified by a corpus of documents associated with a classification. The corpus of documents can be those documents identified by users to include content associated with a particular classification. The classification module can perform a variety of tests on the corpus of documents to identify the defining features of the class of data. In some implementations, the characteristics of subsequently received data can be extracted and compared to the defining features of various identified classes of data to determine whether the subsequently received data belongs to any of the identified classes of data.

In some implementations, the user and/or administrator can define his or her own classifications of data. For example, a user might have his/her own subjective grouping of data. The user can group together documents that exemplify the types of data the user would assign to the classification. In such implementations, the classification module 210 can examine the user defined grouping and identify the distinguishing features that define the class. The classification module 210 can then extract characteristics from subsequently received data and compare the extracted characteristics to the user defined category to determine whether the subsequently received data belongs to the user defined category. Multiple user and/or administrator defined categories can be generated based upon user and/or administrator input.

After classifying the data stream, the network traffic management system 110a can use a prioritization module 220 to determine a priority associated with the data stream. The prioritization module 220 can include a prioritization scheme operable to define a hierarchy associated with classification types. In various examples, the prioritization module can be operable to allocate bandwidth to each of the data streams based upon the classification associated with the respective data streams. For example, a data stream having a highest priority classification can be allocated bandwidth first, a data stream having a second priority classification can be allocated bandwidth second, a data stream having a third priority classification can be allocated bandwidth third, etc.

In some implementations, the prioritization module 220 is operable to receive prioritization input 230 (e.g., a command or instruction). The prioritization input 230, for example, can include specification of a prioritization scheme. In some implementations, the prioritization input 230, can include a signal to enable prioritization of the data streams. Upon prioritizing the data streams, the communications interface 200 can transmit the data streams to their respective destination based upon prioritization of the data streams.

Figure 3:
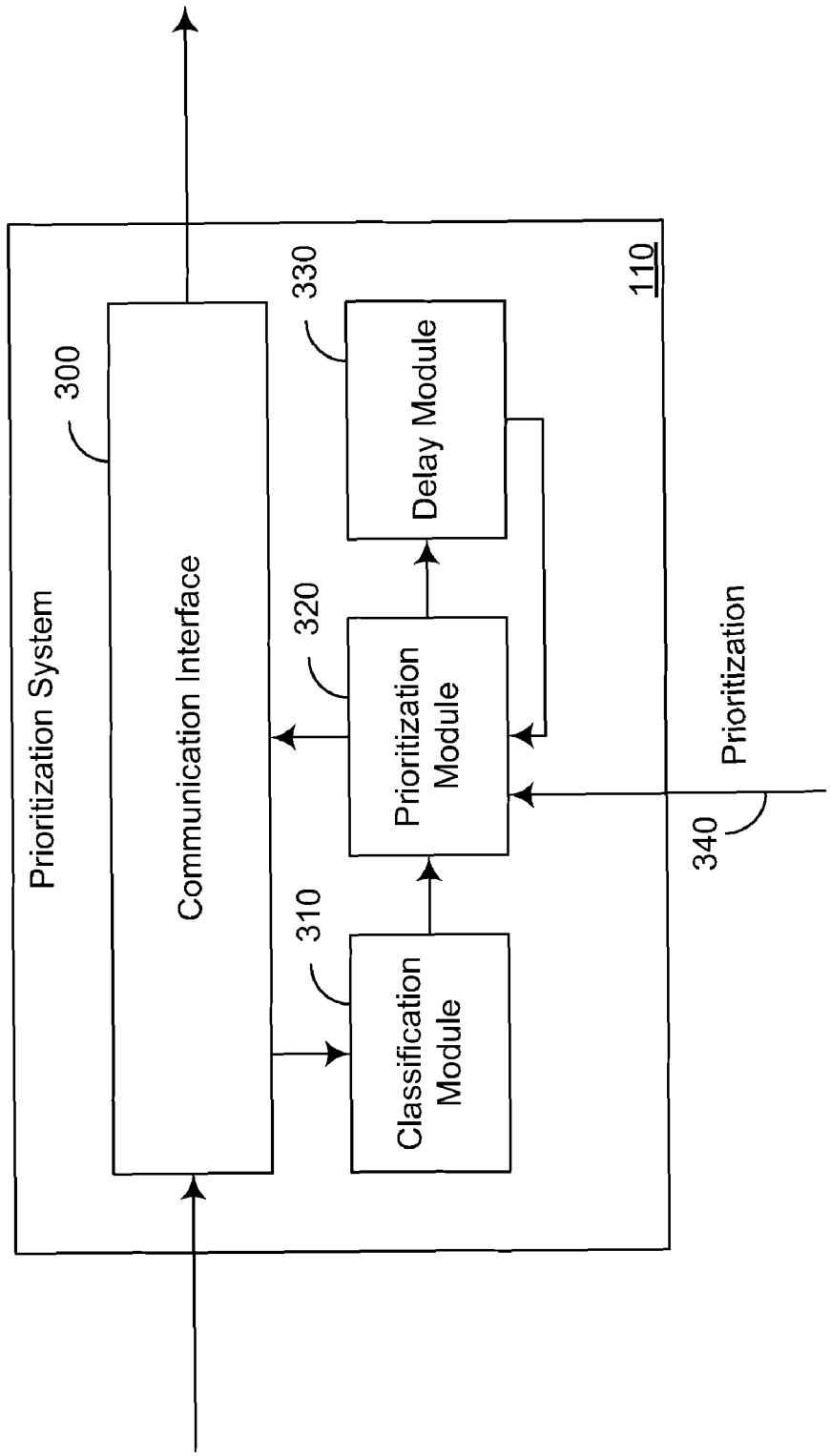
FIG. 3 is a block diagram depicting another example of a network traffic prioritization system.

FIG. 3 is a block diagram depicting another example of a network traffic prioritization system 110b. In some implementations, the network traffic prioritization system 110b can include a communications interface 300, a classification module 310, a prioritization module 320 and a delay module 330. In some implementations, the communications interface 200 can be a router.

The classification module 310, in various implementations, can operate to classify data streams based upon the characteristics associated with the data streams. The classification module 310c an apply multiple tests to an individual communication and derive a result array from the message. The result array can be compared to characteristics of known communication classifications in order to define the classification associated with the data stream. Classification of the data streams can be used to determine a priority associated with each of the respective data streams.

Upon classifying the data stream, the network traffic management system 110b can use a prioritization module 320 to determine a priority associated with the data stream. The prioritization module 320 can include a prioritization scheme operable to define a hierarchy associated with classification types. In various examples, the prioritization module can be operable to send a low priority data stream to a delay module 330. In some implementations, the delay module 330 can include a low priority queue, whereby high priority traffic is transmitted based upon the available bandwidth, while data in the low priority queue is held until there is no high priority traffic to transmit.

In some implementations, the prioritization module 320 is operable to receive prioritization input 340. The prioritization input 340, for example, can include specification of a prioritization scheme. In some implementations, the prioritization input 340, can include a signal to enable prioritization of the data streams. Upon input from the prioritization module 320, the communications interface 300 can transmit the data streams to their respective destination.

Figure 4:
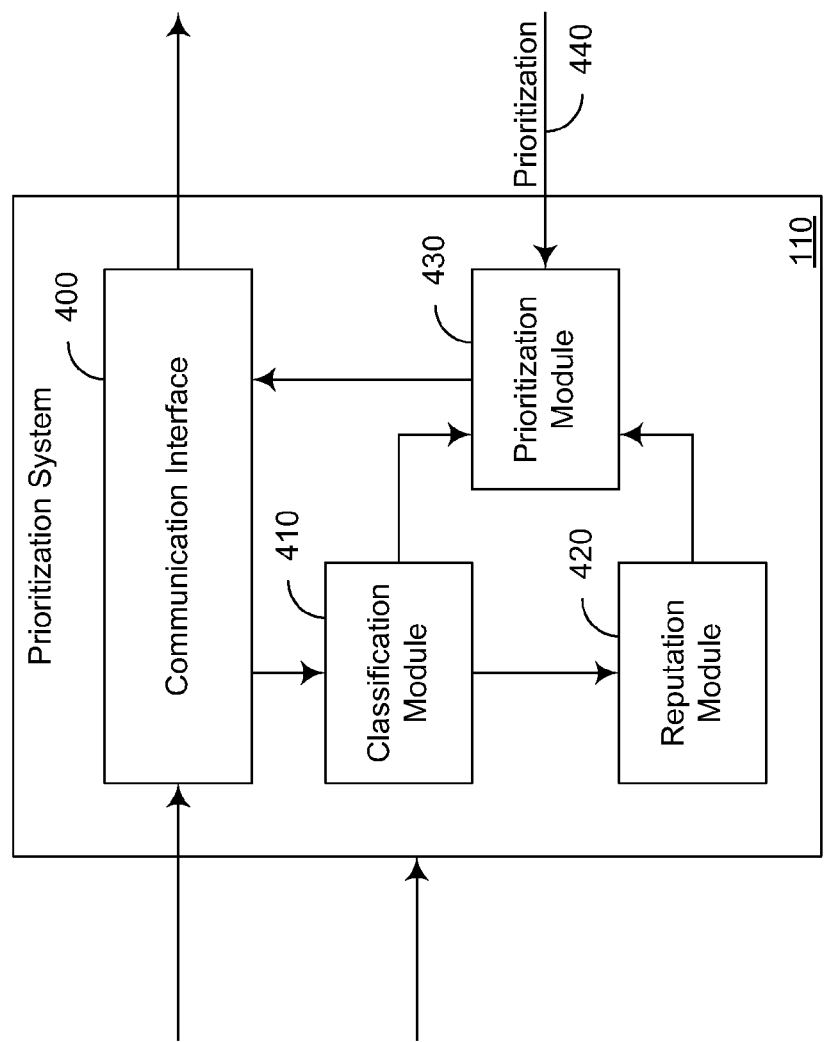
FIG. 4 is a block diagram depicting another example of a network traffic prioritization system.

FIG. 4 is a block diagram depicting another example of a network traffic prioritization system 110c. In some implementations, the network traffic prioritization module 110c can include a communications interface 400, a classification module 410, a reputation module 420 and a prioritization module 430. The network traffic prioritization system 110c can be used to prioritize specific classifications of traffic over other classifications of traffic. For example, business traffic or government traffic can be prioritized over spam traffic.

The communications interface 400, in some implementations, can include the functionality of a router. For example, the communications interface can be operable to parse the data packets to determine a destination associated with each of the data packets. The communications interface 400 can forward the data packets to the destination responsive to input received from the prioritization module 430.

The classification module 410, in various implementations, can operate to classify data streams based upon the characteristics associated with the data streams. The classification module 410 can apply multiple tests to an individual communication and derive a result array from the message. The result array can be compared to characteristics of known communication classifications in order to define the classification associated with the data stream. Classification of the data streams can be used to determine a priority associated with each of the respective data streams.

A reputation module 420 can operate to determine the reputation associated with an originating entity (e.g., entity 120 of FIG. 1) or a receiving entity (e.g., entity 130 of FIG. 1). The reputation can be used to determine a reputation of the originating or receiving entity for various classifications of traffic. Reputation modules are describe in more detail in U.S. patent application Ser. No. 11/142,943, entitled "Systems and Methods for Classification of Messaging Entities," filed on Jun. 2, 2005, which is hereby incorporated by reference in its entirety. Additional implementations of reputation modules can be found in U.S. patent application Ser. No. 11/626,462, entitled "Correlation and Analysis of Messaging Identifiers and Attributes," filed on Jan. 24, 2007. In some implementations, the reputation of an entity for participating in types of activity can be used in conjunction with message classification to determine a priority associated with a data stream. For example, a data stream with a weak spam classification can be made stronger based on the data stream being associated with an entity that has a reputation for originating or receiving spam.

After classification of the data stream and reputation of the entities associated with the data stream, the network traffic management system 110c can use a prioritization module 430 to determine a priority associated with the data stream. The prioritization module 430 can include a prioritization scheme operable to define a hierarchy associated with classification types and reputations. In some implementations, the prioritization module can allocate priority to certain classifications of data streams or entities with reputations for transmitting those classifications of data streams over other classifications of data streams and entity reputations based upon a prioritization scheme. The prioritization scheme can be provided, for example, by an administrator. In other examples, the prioritization scheme can be provided by a governmental entity.

In some implementations, the prioritization module 430 is operable to receive prioritization input 440. The prioritization input 440, for example, can include specification of a prioritization scheme. In some implementations, the prioritization input 440, can include a signal to enable prioritization of the data streams. Upon input from the prioritization module 430, the communications interface 400 can transmit the data streams to their respective destination.

Figure 5:
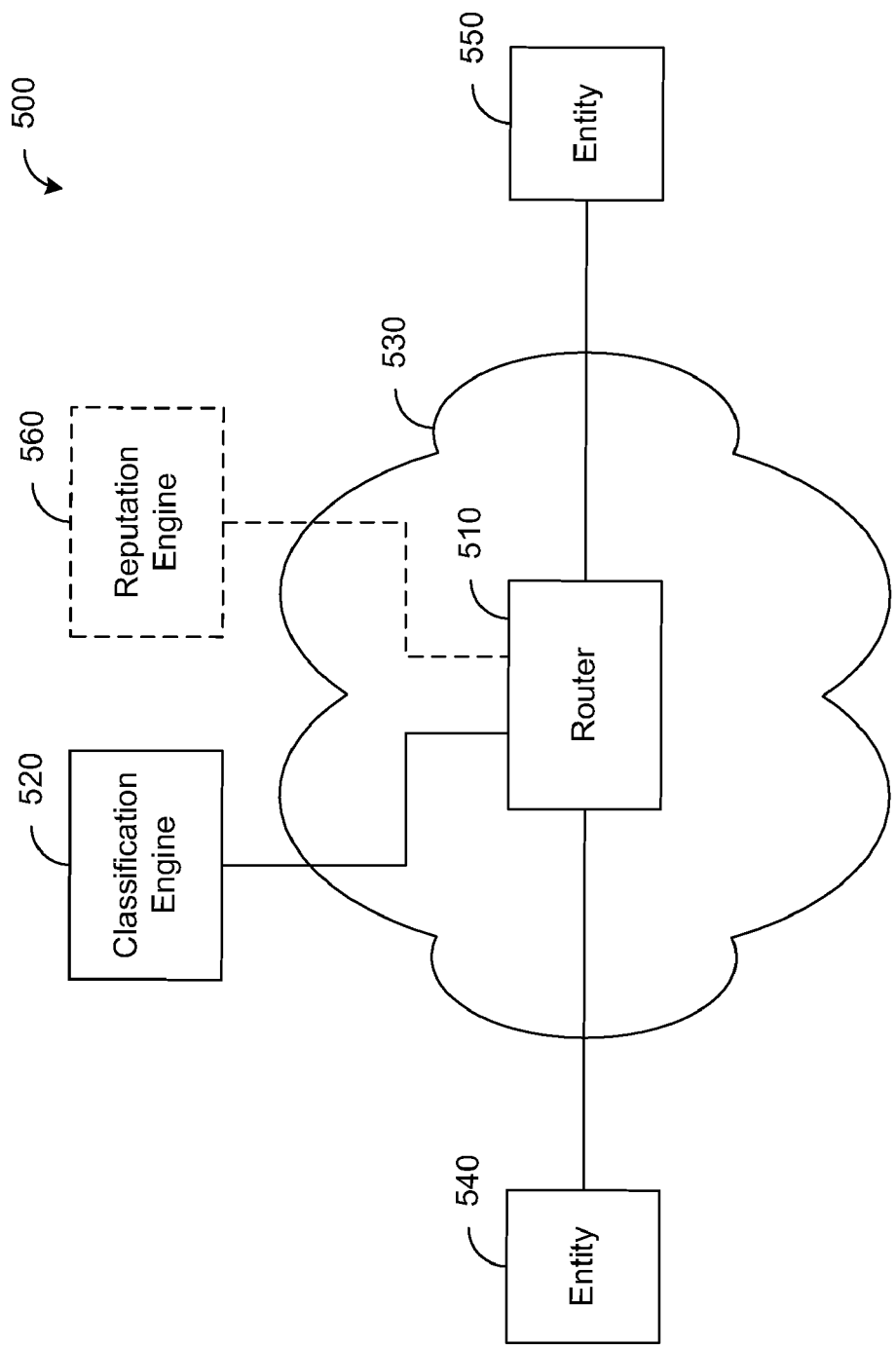
FIG. 5 is a block diagram illustrating an example network architecture including a router operable to receive input from a classification engine.

FIG. 5 is a block diagram illustrating an example network architecture 500 including a router 510 operable to receive input from a classification engine 520. In some implementations, the router 510 can be part of a network 530, and operable to route traffic between a first entity 540 and a second entity 550. The router 510 can request classification information from the classification engine 520. The classification information can be used by the router 510 to determine whether to prioritize the associated data stream. In some implementations, the router 510 can operate to prioritize data packets based upon the classification associated with the data packets included in the data stream. Thus, data streams of higher priority can be allocated bandwidth prior to allocation of bandwidth to lower priority data streams independent of the order in which the data packets associated with the data stream are received.

In optional implementations, the router 510 can retrieve reputation information associated with the data streams from a reputation engine 560. The reputation information can be used to determine whether to provide priority to data streams associated with an entity of a given reputation. For example, entities with a reputation for sending government traffic might be provided priority over other entities in emergency situations. In other examples, data streams originating from entities with strong reputations for transmitting spam might be assigned a low priority with respect to data traffic originating from entities with reputations for originating reputable traffic. In additional implementations, reputation information can be used to confirm weak classifications of data streams.

In some implementations, the router can use the classification and/or reputation information to assign a priority associated with the data stream. Data streams of a first priority can be given transmission priority over data streams of a second or lower priority. Similarly, data streams of a second priority can be given transmission priority over data streams of a third or lower priority. Priority can be attained through allocation of bandwidth, delay of lower priority traffic, or transmission of low priority traffic during periods of inactivity.

Figure 6:
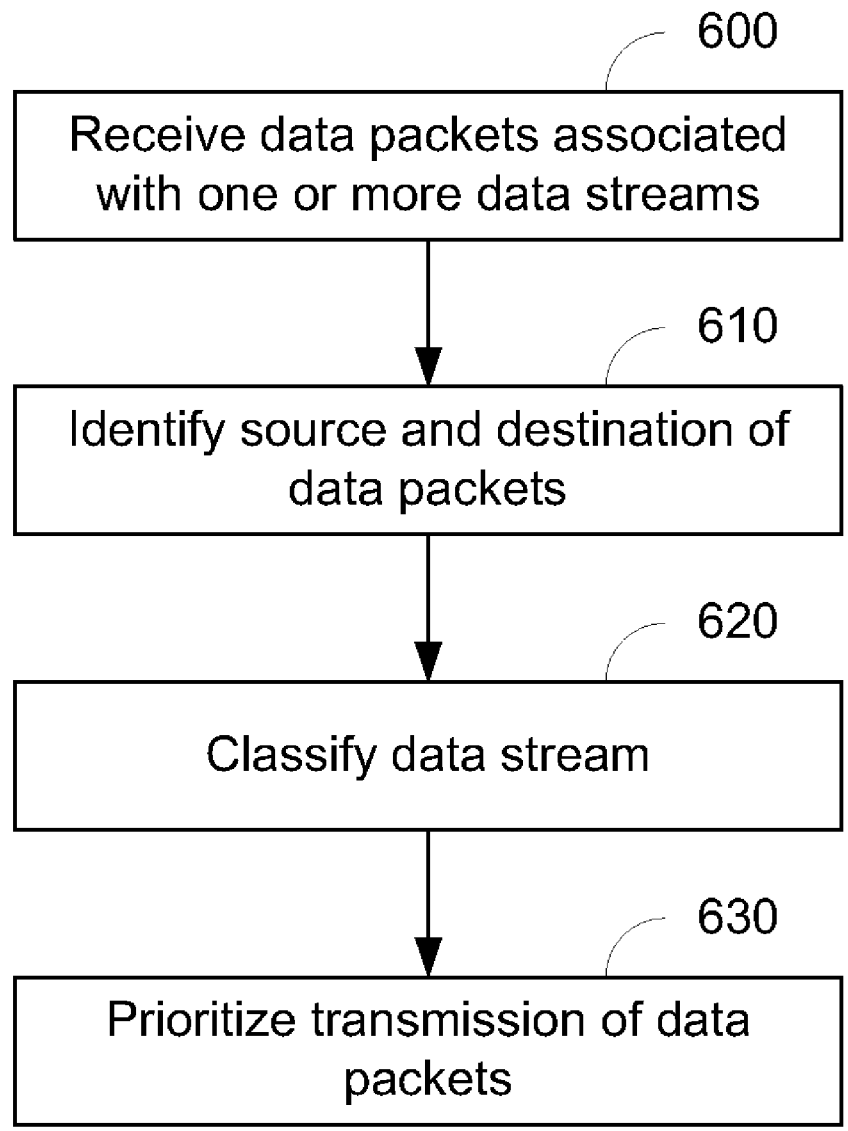
FIG. 6 is a flow diagram illustrating an example network traffic prioritization process.

FIG. 6 is a flow diagram illustrating an example network traffic prioritization process. At stage 600 data packets associated with one or more data streams are received. The data packets can be received, for example, by a communications interface (e.g., communications interface 200 of FIG. 2). The data packets can include a header and a payload. The header, for example, can identify an origination address and a destination address. The payload, for example, can identify the data being transmitted (e.g., a music download, a spam message, a teleconference, a voice over internet protocol communication, etc.).

At stage 610 a source and destination address of the data packets can be identified. The source and destination address can be identified, for example, by a communications interface (e.g., communications interface 200 of FIG. 2). In various implementations, the data packets can be parsed to identify the source and destination addresses from the data packet headers. The data packet headers can also identify a data stream to which the data packet belongs. In various implementations, the source and destination address can be used to determine a routing of the data packets.

At stage 620 the data stream is classified. The data stream can be classified, for example, by a classification module (e.g., classification module 210 of FIG. 2). In some implementations, the data stream can be classified based upon the identification of numerous characteristics associated with the data stream. The characteristics can be identified, for example, by multiple tests operating on the data packets and/or data stream. In some implementations, the data stream can be assembled to apply one or more tests to the data associated with the data stream. For example, an electronic message might be assembled to determine whether the message includes attributes characteristic of spam messages.

At stage 630 transmission of data packets can be prioritized. The transmission of data packets can be prioritized, for example, by a prioritization module (e.g., prioritization module 220 of FIG. 2). In some implementations, the prioritization module can prioritize the data streams based upon a prioritization scheme. For example, a prioritization scheme can define a hierarchy associated with each classification of data stream. In various implementations, the data streams can be prioritized through the allocation of bandwidth to a data stream based upon a classification associated with the data stream.

Figure 7:
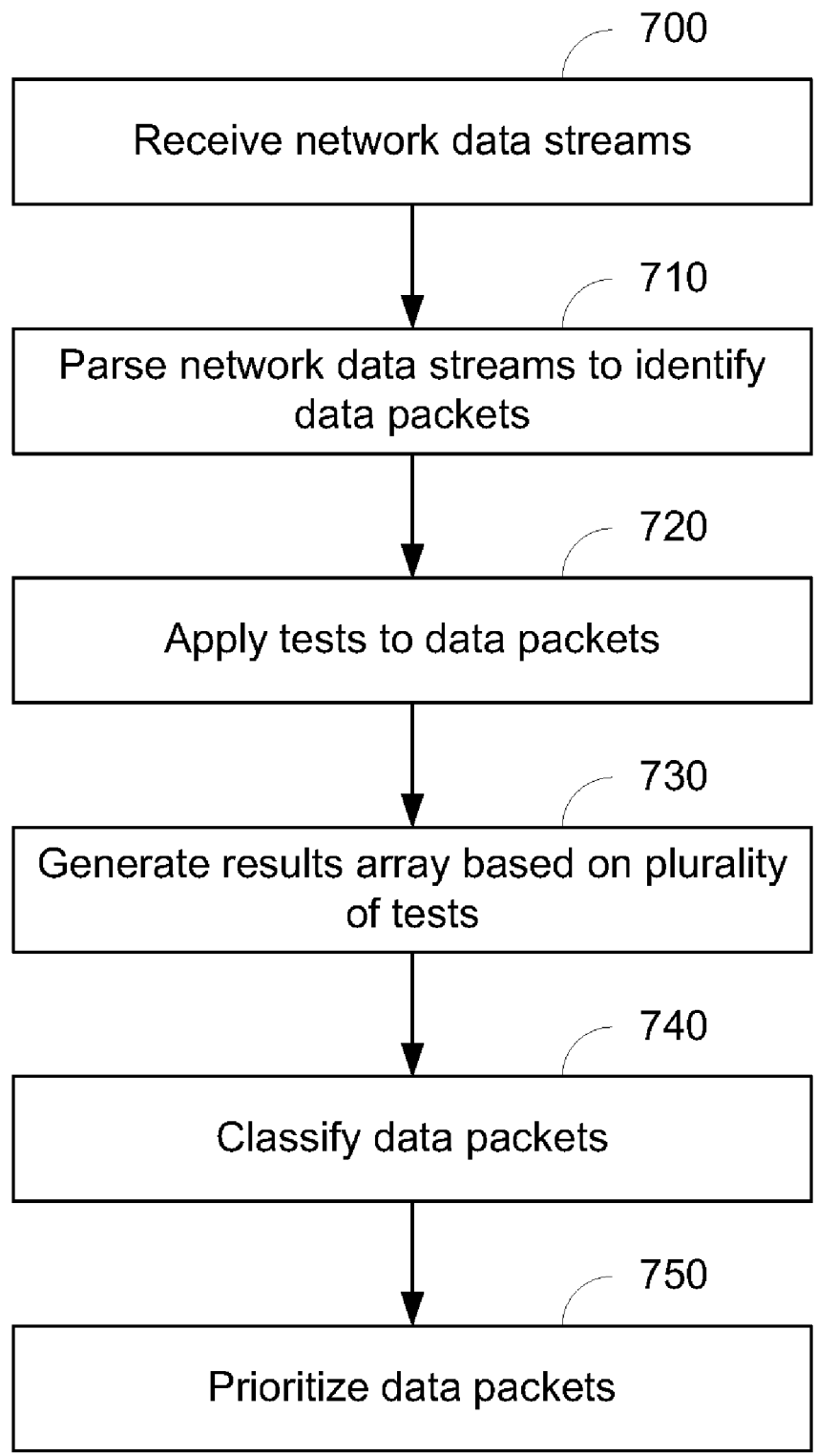
FIG. 7 is a flow diagram illustrating an example classification and prioritization process.

FIG. 7 is a flow diagram illustrating an example classification and prioritization process. At stage 700, network data streams are received. The data streams can be received, for example, by a communications interface (e.g., communications interface 200 of FIG. 2). The data streams can include a number of data packets. Each of the data packets can identify the stream it belongs to as well as source and destination address for routing purposes.

At stage 710, the data streams can be parsed to identify data packets within the streams. The data streams can be parsed, for example, by a communications interface (e.g., communications interface 200 of FIG. 2). The parsing of the data stream can enable reconstruction of the data, as well as provide information about the originating entity and the receiving entity.

At stage 720, multiple tests can be applied to the data packets. The tests can be applied to the data packets, for example, by a classification engine (e.g., classification module 210 of FIG. 2). Such tests are described in U.S. patent application Ser. No. 11/173,941, entitled "Message Profiling Systems and Methods." Additional tests are described in U.S. patent application Ser. No. 11/383,347, entitled "Content-Based Policy Compliance Systems and Methods," filed on May 15, 2006, which is hereby incorporated by reference in its entirety. In various implementations, the multiple tests can include tests to identify spam characteristics within the data, based upon size, data characteristics, header characteristics, etc. In additional implementations, other tests can be applied to the data to identify similarities between the data and known business data.

At stage 730, a results array can be generated based on the tests. The results array can be generated, for example, by a classification engine (e.g., classification module 210 of FIG. 2). In various implementations, the results array includes the results of each of the tests and can be compared to characteristic arrays that define various classifications of data communications.

At stage 740, the data packets are classified. The data packets can be classified, for example, by a classification engine (e.g., classification module 210 of FIG. 2). In some implementations, the data packets can be classified based upon the similarity of a data stream to data streams of known classification type. For example, the results array can be compared to a characteristic array associated with a classification type, and based upon the similarities between the results array and the characteristic array the data can be classified.

At stage 750, the data packets are prioritized. The data packets can be prioritized, for example, by a prioritization engine (e.g., prioritization module 220 of FIG. 2). In some implementations, the data packets can be prioritized based upon a prioritization scheme. The prioritization scheme, for example, can identify a hierarchy in which data of the highest classification is transmitted with priority over all other data types, and each succeeding priority level is transmitted with priority over other lower priority data types.

The systems and methods disclosed herein may use data signals conveyed using networks (e.g., local area network, wide area network, internet, etc.), fiber optic medium, carrier waves, wireless networks (e.g., wireless local area networks, wireless metropolitan area networks, cellular networks, etc.), etc. for communication with one or more data processing devices (e.g., mobile devices). The data signals can carry any or all of the data disclosed herein that is provided to or from a device.

The methods and systems described herein may be implemented on many different types of processing devices by program code comprising program instructions that are executable by one or more processors. The software program instructions may include source code, object code, machine code, or any other stored data that is operable to cause a processing system to perform methods described herein.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that software instructions or a module can be implemented for example as a subroutine unit of code, or as a software function unit of code, or as an object (as in an object-oriented paradigm), or as an applet, or in a computer script language, or as another type of computer code or firmware. The software components and/or functionality may be located on a single device or distributed across multiple devices depending upon the situation at hand.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context clearly dictates otherwise.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

These and other implementations are within the scope of the following claims.

What is claimed is:

1. A computer implemented network traffic prioritization method comprising:
   receiving a plurality of network traffic streams, the network traffic streams comprising data communicated between sender devices and recipient devices;
   parsing the network traffic streams based upon one or more transmission protocols associated with the network traffic streams, the parsing being operable to identify data packets respectively associated with the traffic streams;
   applying a plurality of tests to the data packets, each of the plurality of tests being operable to test the data packets for a classification characteristic;
   generating a results array comprising results from each of the classification characteristics identified by the plurality of tests;
   classifying each of the data packets into one or more classifications from a plurality of classifications based upon the results array;
   deriving reputations associated with a plurality of originating or destination entities associated with the network traffic streams; and
   prioritizing the network traffic streams associated with the data packets based upon a prioritization scheme that is based at least in part upon a reputation of the associated originating or destination entity, the prioritization scheme being based on the one or more classifications associated with the data packet.

2. The method of claim 1, further comprising:
   receiving a that specifies a traffic prioritization scheme that restricts the flow of a classification of traffic; and
   wherein the prioritization of the traffic streams is based upon receiving the command.

3. The method of claim 2, further comprising dropping packets associated with a specified classification based on the command.

4. The method of claim 2, further comprising delaying packets associated with a specified classification based on the command.

5. The method of claim 1, wherein the plurality of classifications comprise one or more categories of content type, traffic behavior, and risk exposure.

6. The method of claim 1, wherein the plurality of classifications comprises low priority traffic and high priority traffic.

7. The method of claim 1, wherein classifying comprises comparing the results array to one or more classification arrays, and wherein the one or more classification arrays are characteristic of an associated classification of traffic.

8. The method of claim 1, further comprising:
   receiving a prioritization instruction, the prioritization instruction comprising a request to prioritize a specific classification of traffic; and
   prioritizing traffic based on the prioritizing instruction.

9. The method of claim 1, wherein the plurality of classifications comprise content type.

10. A computer implemented traffic prioritization method comprising:
- receiving a plurality of data packets associated with a plurality of data streams;
- identifying a source and a destination associated with a number of the data packets, the identifying comprising parsing a received data packet to identify a source address or a destination address associated with the received data packet;
- determining a reputation associated with the source or the destination;
- classifying the data stream associated with the number of data packets based upon similarities to a plurality of classified types of data streams; and
- prioritizing transmission of the data packets based upon a classification associated with each of the data streams that is based at least in part upon the reputation associated with the source or destination.

11. The method of claim 10, wherein prioritizing the transmission of the data packets comprises ensuring a connection specific classifications of data streams, while transmission of other classifications of data streams is based upon dynamic policy and network bandwidth available after transmission of the specific classification of data streams.

12. The method of claim 10, wherein prioritizing the transmission of the data packets comprises:
- recursively allocating network bandwidth to each of the plurality of data streams based upon a prioritization policy specifying a hierarchy associated with each of the classification types until no bandwidth remains;
- identifying a prioritization policy, the prioritization policy comprising a prioritization of each of a plurality of classification types.

13. The method of claim 10, wherein prioritizing the transmission of the data packets comprises:
- identifying a prioritization policy, the prioritization policy specifying a prioritization of each of a plurality of classification types; and
- transmitting the data streams based upon the prioritization policy.

14. The method of claim 10, further comprising:
- transmitting the data packets based upon prioritization of the data streams.

15. The method of claim 10, wherein determining a reputation associated with the source or the destination comprises retrieving a reputation from a reputation server.

16. The method of claim 10, wherein classifying the data stream comprises:
- applying a plurality of tests to one or more of the plurality of data packets associated with the data stream to generate a results array, wherein the plurality of tests comprise testing for characteristics associated with the one or more of the plurality of data packets;
- comparing the results array associated with the data stream to a plurality of characteristic arrays, each of the plurality of characteristic arrays being associated with a characteristic type of data stream; and
- classifying the data stream based upon the comparison.

17. The method of claim 16, wherein classifying the data stream based upon the comparison comprises classifying the data stream based upon determining a substantial similarity between the results array and one or more of the plurality of characteristic arrays, said one or more of the plurality of characteristic arrays defining the classification associated with the data stream.

18. The method of claim 10, further comprising blocking or de-prioritizing a data stream based upon the classification.

19. The method of claim 10, wherein classifying the data stream based upon similarities to a plurality of classified types of data streams comprises comparing characteristics of the data stream to characteristics of the other data streams.

* * * * *

UNITED STATES PATENT AND TRADEMARK OFFICE
CERTIFICATE OF CORRECTION

| | |
|---|---|
| PATENT NO. | : 8,045,458 B2 |
| APPLICATION NO. | : 11/937274 |
| DATED | : October 25, 2011 |
| INVENTOR(S) | : Dmitri Alperovitch |

It is certified that error appears in the above-identified patent and that said Letters Patent is hereby corrected as shown below:

(Claim 2, Line 2) Column 10, Line 43, in Claim 2, delete "a" (first occurrence) and insert -- a command --, therefor.

Signed and Sealed this
Sixth Day of March, 2012

David J. Kappos
*Director of the United States Patent and Trademark Office*